(12) United States Patent  (10) Patent No.: US 8,911,122 B2
Meersman et al.  (45) Date of Patent: Dec. 16, 2014

(54) SEAM HIDER FOR TILED DISPLAYS

(75) Inventors: Karim Meersman, Kortemark (BE); Kristof Vanluchene, Dentergem (BE)

(73) Assignee: Barco N.V., Kortrijk (BE)

( * ) Notice: Subject to any disclaimer, the term of this patent is extended or adjusted under 35 U.S.C. 154(b) by 1415 days.

(21) Appl. No.: 12/222,253

(22) Filed: Aug. 6, 2008

(65) Prior Publication Data

US 2009/0073080 A1  Mar. 19, 2009

(30) Foreign Application Priority Data

Aug. 6, 2007 (EP) ...................................... 07447049

(51) Int. Cl.
*F21S 13/10* (2006.01)
*G02F 1/1333* (2006.01)

(52) U.S. Cl.
CPC ................................. *G02F 1/13336* (2013.01)
USPC ........................................................ 362/367

(58) Field of Classification Search
USPC ............. 349/73; 362/357, 367; 361/730, 731, 361/732, 733
See application file for complete search history.

(56) References Cited

U.S. PATENT DOCUMENTS

| | | | |
|---|---|---|---|
| 5,759,644 A * | 6/1998 | Stanley | ............................ 428/14 |
| 6,734,617 B2 | 5/2004 | Sundahl | |
| 2002/0140342 A1 | 10/2002 | Sundahl | |
| 2002/0163301 A1 | 11/2002 | Morley et al. | |
| 2003/0010893 A1 * | 1/2003 | Matthies | ..................... 250/208.1 |
| 2005/0078104 A1 * | 4/2005 | Matthies et al. | ............... 345/204 |
| 2005/0225238 A1 * | 10/2005 | Yamazaki | ...................... 313/506 |
| 2006/0083027 A1 * | 4/2006 | Lin et al. | ........................ 362/615 |
| 2009/0090709 A1 * | 4/2009 | Shalomoff | ......................... 220/6 |

OTHER PUBLICATIONS

European Search Report in European Application EP 07447049.3-1228, Nov. 7, 2007 (4 pgs.).
Chinese Office Action issued in CN 200810131296.5, dated Oct. 31, 2012, and English translation thereof.
Examination Report of China Patent Office regarding CN 2008 10131296.5, Nov. 8, 2011 (English translation).
Communication of the EPO regarding European Patent Application No. 07 447 049.3-1228, Feb. 20, 2011.

\* cited by examiner

*Primary Examiner* — Andrew Coughlin
(74) *Attorney, Agent, or Firm* — Bacon & Thomas, PLLC

(57) ABSTRACT

A tiled display (100) for lighting or imaging includes a plurality of display tiles (110) arranged side by side. The tiled display (100) furthermore includes a seam hiding arrangement (114) formed of at least one light absorbing cloth or textile (114) in a seam (112) between two neighboring display tiles (110). A corresponding method for assembling or adjusting a tiled display is described. The seam hiding arrangement may be used for blocking environmental light or stray light in the seams and optionally also for aligning or controlling the position of the display tiles.

14 Claims, 4 Drawing Sheets

SEAM HIDER FOR TILED DISPLAYS

TECHNICAL FIELD OF THE INVENTION

The present invention relates to the field of imaging or lighting systems. More particularly, the present invention relates to tiled display systems and methods for assembling or adjusting tiled display systems having a good overall imaging quality.

BACKGROUND OF THE INVENTION

The use of large format display systems is widely spread and finds applications in control rooms, for advertising, for displaying at events, etc. Most large format display systems used are tiled display systems, constructed out of a number of display tiles or display modules. The latter allows to obtain larger display surfaces than obtainable using conventional displays, by placing a plurality of display tiles adjacent to each other and spread the lighting or imaging output over the different display tiles. The display tiles or modules are mechanically coupled together in order to form the full large format display. The space or gap between the different tiles or modules of the display is called a seam. A plurality of problems are identified in tiled displays, such as for example mechanical stability and strength and imaging or lighting quality near the seams. In U.S. Pat. No. 6,734,617 a tiled flat-panel display is described wherein an increased mechanical stability is obtained by adding stiffening straps at the back of the display modules running across the seams between individual display modules. These redistribute the stress to the straps, thus avoiding damaging of the display system.

In order to obtain a good lighting or imaging quality, the seam should be invisible. Visibility of seams can occur for a number of reasons. One cause of visibility of the seams is the change in pitch between pixels of neighbouring tiles compared to the pitch between pixels of one tile, which is amongst others determined by the alignment of the display tiles. The seam appears as a dark line if the gap between display tiles increases the pitch between individual light sources (e.g. LED's) or pixels at the edge of neighbouring tiles compared to the pitch between individual light sources or pixels within one tile. The seam appears as a bright line at the crossing between display tiles, if the gap between display tiles decreases the pitch between individual light sources (e.g. LED's) at the edge of neighbouring tiles compared to the pitch between individual light sources or pixels within one tile. In the first case the energetic light flux at the mechanical connection of the display tiles decreases, in the second case the energetic light flux increases. Therefore it is advantageous to keep the pitch between individual light sources constant even over the edges of neighbouring tiles. Another cause of visibility of seams between tiles may be the presence of environmental or stray light, e.g. incident on the backside of the tiled display and guided through the seams in the viewing direction.

Some solutions to reduce or avoid these causes of visibility of the seams in tiled display systems have already been provided. For example in US patent application 2002/0163301, a tiled display is described wherein seams between tile modules are filled with optical clear, substantially index matching gap material. The material is adhesive and applied in the seams between the display tile modules. In order to cover the front of the seams, a black patterned coating may be applied to the front of the tiled display, e.g. in a form of horizontal and vertical stripes.

SUMMARY OF THE INVENTION

It is an object of embodiments of the present invention to provide good tiled display systems and corresponding display tiles and good methods for assembling or adjusting tiled displays. It is an advantage of embodiments of the present invention that display systems are obtained with good overall large-format imaging qualities. The above object and advantages will be obtained with systems and methods according to embodiments of the present invention.

The present invention relates to a tiled display for lighting or imaging, the tiled display comprising a plurality of display tiles arranged side by side, the tiled display furthermore comprising a seam hiding means comprising at least one light absorbing textile or cloth in a seam between two neighbouring display tiles It is an advantage of embodiments according to the present invention that these provide tiled displays wherein seams between display tiles can be made substantially invisible. It is an advantage that environmental light or stray light may be absorbed in the seams, thus reducing or avoiding unwanted light and often disturbing light to be visible in the imaging or lighting. It is furthermore an advantage of embodiments according to the present invention that the materials used for hiding the seams may be substantially resistant to radiation, e.g. UV radiation. The latter may be especially advantageous as tiled display systems such as large format displays often are for outdoor use. It is also an advantage of embodiments according to the present invention that the materials used for hiding the seams may be substantially resistant to heating, e.g. substantially more resistant to heating than rubbers.

The at least one light absorbing textile or cloth may be connected to at least one display tile. It may be suitable for being connected to a neighbouring display tile of the at least one display tile. It is an advantage of embodiments according to the present invention that the material used for hiding the seams at the same time can be used for assisting in alignment of the display tiles, thus resulting in a high quality of imaging or lighting, e.g. imaging or lighting with a high uniformity. It is an advantage of embodiments according to the present invention that the material used for hiding the seams may assist in maintaining the required thickness of the seams between the tiles, e.g. corresponding with a pitch between pixels in the display tiles used. It is furthermore an advantage that such an alignment may be substantially resistant to deterioration by heat or radiation.

The at least one absorbing textile or cloth may be connected to an edge of the at least one display tile. It is an advantage of embodiments according to the present invention that the provision of material for hiding seams between display tiles during assembly can be easy, as the material already may be applied to the display tile before building up the tiled display wall.

The seam hiding means may comprise a second textile or cloth connected to an edge of said neighbouring display tile, wherein the at least one absorbing textile or cloth may be adapted to interact with said second textile or cloth by shifting erect parts erecting from a surface of the first textile or cloth in between erect parts erecting from a surface of the second textile or cloth. It is an advantage of embodiments according to the present invention that the material for hiding seams, e.g. by blocking light and assisting in aligning the display tiles for controlling the width of the seams between the display tiles, can be applied prior to assembling the display tile wall, resulting in an easier assembling process. It is an advantage of embodiments according to the present invention that the assembly of the a tiled display wall is efficient, as filling of the seams can be done automatically by placing the display tiles next to each other, reducing or even avoiding the need for additional steps for hiding the seams after the display tiles have been positioned next to or adjacent each other.

The light absorbing textile or cloth and the second textile or cloth may be connected to an edge of said neighbouring display tile. It may be any of hook and loop fasteners, burr fasteners or touch fasteners or part of hook and loop fasteners such as the part of the fasteners comprising loops.

It is an advantage of embodiments according to the present invention that maintenance or replacement of display tiles in the tiled display (wall) can be advantageously done as the material for hiding the seams and assisting in the alignment of the tiles may be adapted for reversibly forming a seam hiding means in between the display tiles.

The second textile or cloth may be a light absorbing textile or cloth. It is an advantage of embodiments according to the present invention that the amount of unwanted light can even further be reduced.

The seam hiding means may have an average compressive strength for providing a counter pressure to a shifting display tile so as to assist in aligning the display tiles in the tiled display. It is an advantage of embodiments according to the present invention that the cloth can be selected so as to avoid slipping or shifting, e.g. due to gravity, of the display tiles, e.g. during assembling. The latter is advantageous as it allows to maintain predetermined seam widths, advantageously corresponding with the pitch between different pixels of the display tiles.

The seam hiding means may have an average compressive strength adapted for countering a gravity force of a single display tile.

The at least one light absorbing textile or cloth of the seam hiding means may have an average compressive strength of between 0.01 kPa and 10 kPa at a deformation of 25, or a deformation of 33% or a deformation of 50%.

The compressive strength of the seam hiding means may be sufficient to counter a shifting force of a display tile, for example to counter a force between 1N and 100N, e.g. between 5N and 15N.

It is an advantage of embodiments of the present invention that the seam hiding means may fulfill both the action of alignment of the tiles resulting in an appropriate seam size and the action of optical blocking, resulting in less or no unwanted light being visible. The latter reduces the number of components needed for making the seams invisible. Furthermore, the seam hiding means is reusable and the alignment function is substantially not influenced by radiation, heating, destruction due to inserting of the tiles or a combination thereof.

The textile or cloth material of the at least one light absorbing textile or cloth may comprise at least 75% of polyamides. It may comprise 100% polyamide.

The present invention also relates to a tiled display system comprising a tiled display as described above and a driving means for driving a plurality of display tiles in said tiled display.

The present invention furthermore relates to a display tile for use in a tiled display, the display tile comprising a light absorbing textile or cloth connected to the display tile for assisting in hiding of a seam between the display tile and a neighbouring display tiled when the display tile is assembled in a tiled display. The display tile may comprise connecting means for connecting to light absorbing textiles or cloths of neighbouring tiles, when the display tile is assembled in a tiled display.

The display tile may comprise a second textile or cloth that is adapted for interacting with a first light absorbing textile or cloth of a neighbouring tile by shifting erect parts erecting from a surface of the first textile or cloth in between erect parts erecting from a surface of the second textile or cloth.

The present invention also relates to a method for assembling a tiled display, the method comprising obtaining a plurality of display tiles, and arranging said plurality of display tiles side by side, whereby a seam hiding means is provided in at least one seam between two neighbouring display tiles, the seam hiding means comprising at least one light absorbing textile or cloth.

The method may comprise, prior to said arranging, connecting said at least one light absorbing textile or cloth at an edge of a first display tile.

The method furthermore may comprise connecting a second textile or cloth to the display tile that will be positioned neighbouring to the first display tile and wherein arranging said plurality of display tiles side by side comprises providing interaction between a first light absorbing textile or cloth and a second textile or cloth of a neighbouring tile by shifting erect parts erecting from a surface of the first textile or cloth in between erect parts erecting from a surface of the second textile or cloth.

The present invention also relates to a method for adjusting a tiled display, the method comprising removing a display tile thereby removing interaction between a first light absorbing textile or cloth connected to the display tile and a second textile or cloth connected to a neighbouring tile and introducing a controlled and/or adjusted and/or replacement display tile thereby providing interaction between a first light absorbing textile or cloth connected to the controlled and/or adjusted and/or replacement display tile and a second textile or cloth connected to the neighbouring tile.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

Figure 1:
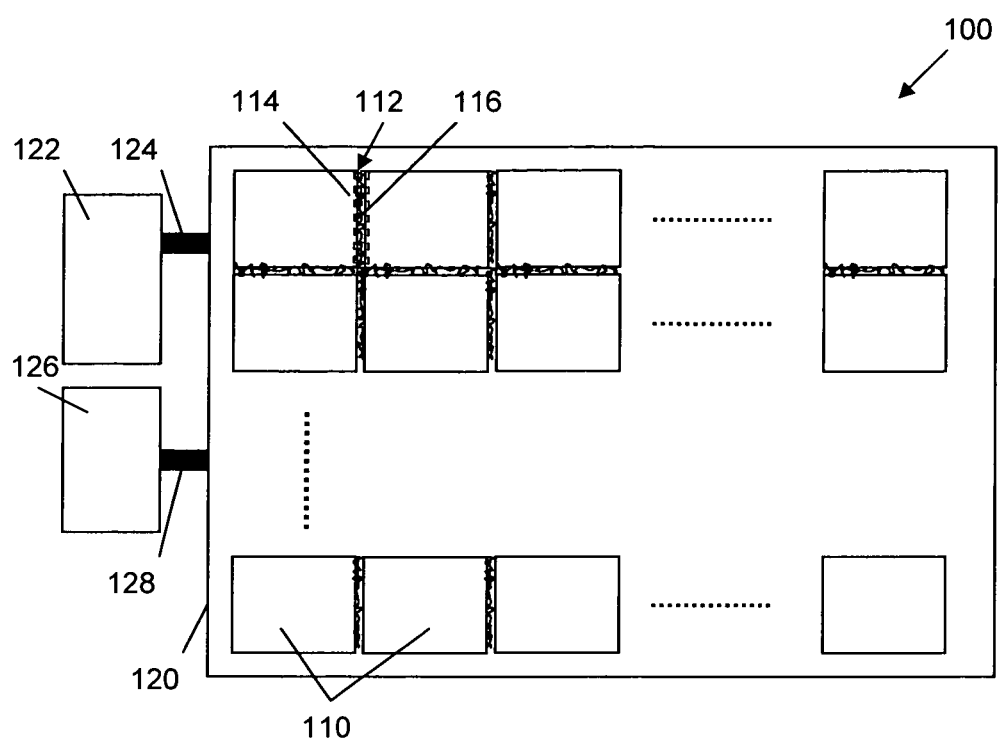
FIG. 1 illustrates an exemplary overview of a tiled display according to embodiments of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. Similarly, it is to be noticed that the term "connected", also used in the claims, should not be interpreted as being restricted to direct connections only, although "connected" includes a direct connection which may be advantageous. Reference throughout this specification to "one embodiment" or "an embodiment" means that a particular feature, structure or characteristic described in connection with the embodiment is included in at least one embodiment of the present invention. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. Furthermore, while some embodiments described herein include some but not other features included in other embodiments, combinations of features of different embodiments are meant to be within the scope of the invention, and form different embodiments, as would be understood by those in the art. In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention. With "cloth" there is meant fabric or material formed by weaving, knitting, pressing or felting of natural or synthetic fibers. Such a cloth may refer for example to a woven or a non-woven textile material.

In a first aspect, the present invention relates to a tiled display for lighting or imaging. Such a tiled display comprises a plurality of display tiles, also referred to as individual display modules, that often are positioned side by side. The display tiles may be based on any kind of addressable display technologies, such as for example phosphorescent, electroluminescent, organic or inorganic emissive, reflective or other known display technologies. It may be tiles comprising a plurality of pixels or light sources, e.g. tiles comprising a plurality of light emitting diodes (LED). The tiled display 100 may e.g. be built up as a matrix of display tiles 110, as shown by way of example in FIG. 1. The number of display tiles used may dependent on the size of the tiled display required and on the size of the individual display tiles. An array of N×M display tiles may for example be used. In between the display tiles 110 gaps are present, also referred to as seams 112. According to the present invention, the tiled display comprises a seam hiding means 114 for hiding the seams 112. Such a seam hiding means 114 comprises at least one light absorbing cloth or textile 116 positioned in a seam between two neighbouring display tiles 110. The light absorbing cloth or textile 116 thus may optically hide the gap between individual display tiles 110: even if this gap is very small, it will, if left unfilled, always pass ambient light or spot light at the back of the display to the front. The light absorbing cloth or textile 116 assists in reducing or avoiding light shining through by absorbing the light by absorbing it. In this way, the environmental light or stray light coupled out in the viewing direction may be significantly reduced or avoided. The latter is advantageous as tiled display often are for outdoor use where the amount of stray light or environmental light may be large.

The tiled display 100 furthermore may comprise a base structure 120 to which the display tiles 110 are mechanically fixed. The mechanical fixing may be any type of mechanical fixing, such as gluing, screwing, clicking, clipping, etc. Advantageously, the mechanical fixing is performed by gluing as this provides larger tolerances for the manufacturing of the different components of the tiled display 100 such as e.g. the display tiles 110 or the base plate 120. It is to be noticed that the tiled display 100 may comprise other features as conventionally present in tiled displays, such as for example a driving means 122 for driving the different display tiles 110 and data connections 124 for providing data flow to the display tiles 110, a power unit 126 and electrical connections 128 for powering the display tiles 110 (e.g. by a daisy chain connection), an optical integrator (not shown) which may be a large plate positioned in front of a plurality of the display tiles, etc, the invention not being limited thereto. These and other optional components may be as known from prior art tiled displays and will therefore be not described in more detail in the present description. The tiled display combined with the driving means for driving the different display tiles 110 may be referred to as a tiled display system.

The characterising components of embodiments of the present invention will now be further discussed in more detail. In embodiments according to the present invention, the tiled display 100 comprises a seam hiding means 114 in between the tiles 110 for hiding the seam 112. The seam hiding means 114 thereby comprises a light absorbing cloth or textile 116. The light absorbing cloth or textile 116 may e.g. be a black cloth or textile. The light absorbing cloth or textile 116 may be adapted for absorbing 50%, more advantageously 75%, even more advantageously 90%, still more advantageously all environmental light or stray light present in the seam. It may be a flexible tissue or textile fabric or textile-like material. It may be a woven or non-woven textile. One example of a cloth or textile material that may be used is a material comprising at least 75% of polyamides or even 100% polyamide. It is an advantage of embodiments according to the present invention that the seam hiding means 114, or more particularly for example the at least one light absorbing cloth or textile 116, is substantially resistant to radiation. As tiled displays often may be used outdoor, a significant amount of radiation, e.g. UV radiation may be incident on the seam hiding means 114. In contrast to e.g. rubber, the at least one light absorbing cloth or textile 116 is significantly less deteriorating under radiation, resulting in a high life time of the seam hiding means 114 and thus a prolonged high quality of the tiled display without the need for quick replacement of the seam hiding means 114. The seam hiding means 114, or more particularly for example the at least one light absorbing cloth or textile 116, may be substantially resistant to heat. In contrast to e.g. rubber, the at least one light absorbing cloth or textile 116 is significantly less deteriorating under heat, resulting in a high life time of the seam hiding means 114 and thus a prolonged high quality of the tiled display without the need for replacement of the seam hiding means 114.

The at least one light absorbing cloth or textile 116 may be unconnected to the display tile edges, and e.g. positioned in the seam between the display tiles 110. They may be further limited by a front plate at the front of the display tiles 110 and a back plate at the back of the display tiles 110. Alternatively, the at least one light absorbing cloth or textile 116 may be connected, e.g. mechanically connected, to at least one of the display tiles 110. Such a connection advantageously may be a connection to the edge of the display tile(s) 110. The connection thereby is such that the at least one light absorbing cloth or textile 116 can be positioned in the seam 112 between the two display tiles 110, i.e. in the gap determined by the two edges of the display tiles 110. It is an advantage of some embodiments according to the present invention that the at least one light absorbing cloth or textile 116 is connected to at least one of the display tiles 110 as the latter can be done prior to assembly thus assisting in a more easy and efficient assembly and/or maintenance. The components of the hiding seams may thus be applied to the individual display tiles 110 prior to assembly of the tiled display 100. In advantageous embodiments, the connection may be reversible.

Figure 2:
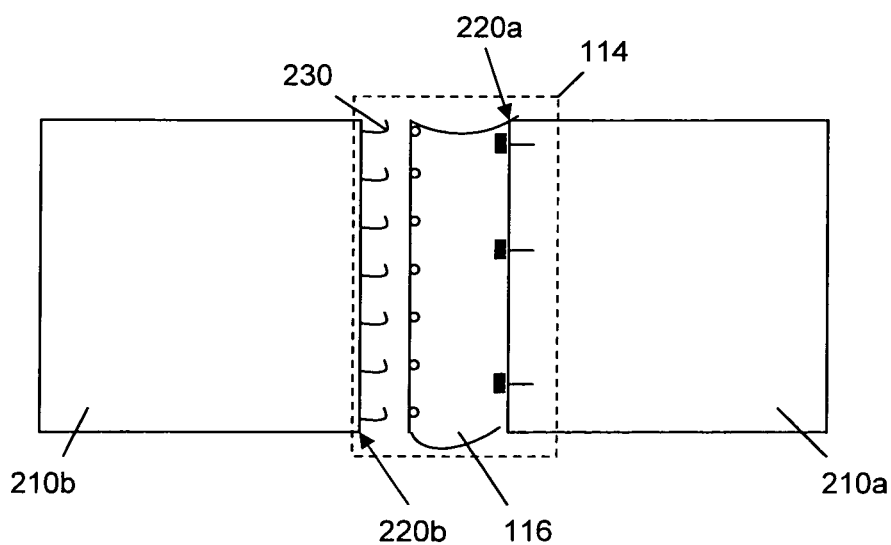
FIG. 2 illustrates part of an exemplary tiled display wherein a light blocking cloth is connected to at least one edge of a display tile, according to a particular embodiment of the present invention.

In one particular example, a tiled display 100 may be provided wherein the at least one light absorbing cloth or textile 116 is connected, e.g. mechanically connected, to at least one display tile 210a, e.g. at the tile edge, and wherein the light absorbing cloth or textile 116 may be suitable for being connected to a neighbouring display tile 210b of the at least one display tile 210a. The neighbouring display tile 210b may comprise a connection means 230 for this purpose, e.g. at an edge of the display tile 210b. The connection between the light absorbing cloth or textile 116 and the at least one display tile 210a may be in any suitable way, such as e.g. glued, stapled, screwed, by engagement with another cloth or textile adjusted to the tile edge, etc. The neighbouring display tile 210b may also be adapted for connecting the light absorbing cloth or textile 116 thereto, e.g. by having a preglued side, having hooks, having a pre-mounted cloth or textile for engaging with the light absorbing cloth or textile 116, having an edge suitable for screwing, stapling, etc. By way of example, FIG. 2 illustrates two display tiles 210a, 210b for use in a tiled display according to an embodiment of the present invention, wherein the light absorbing cloth or textile 116 is connected by screws at an edge 220a of a first tile 210a and is adapted with loops for connection to a second tile 212b, the second tile 212b being provided with a connection means like hooks, e.g. at an edge 220b at the second tile 212b. The connection of the light absorbing cloth or textile 116 to both tiles 210a, 210b further assists in blocking of light coming from behind the tiled display 100.

Figure 3:
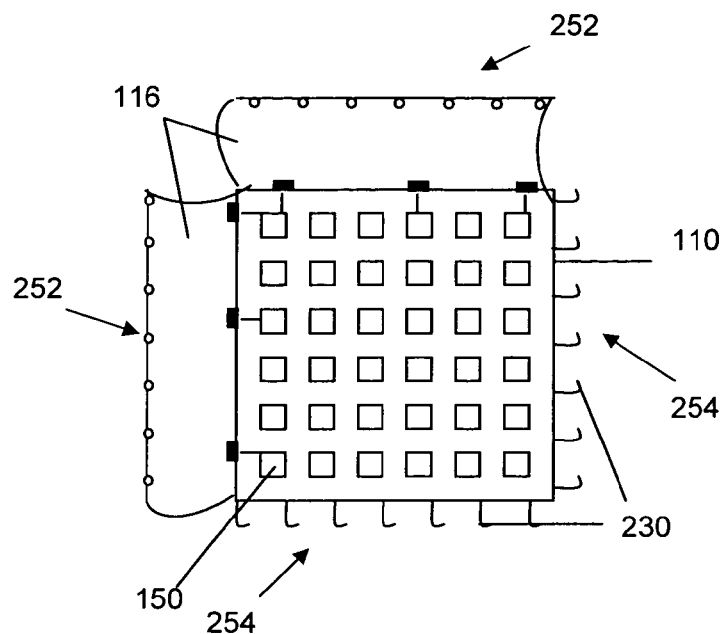
FIG. 3 illustrates an individual display tile with a first light absorbing cloth at first edges and connecting means at second edges of the tile, according to particular embodiments of the present invention.

For ease of manufacturing of the tiles and ease of assembly of the tiled display, a display tile 110 for use in or used in tiled displays according to a particular embodiment, may be provided with light absorbing cloths or textiles 116 mechanically connected to first edges 252 of the display tile 110 and with connection means 230, e.g. mechanical connection means for connecting to light absorbing cloths or textiles 116, at second edges 254 of the display tile 110, such that the tiled display can be built up of identical display tiles, i.e. at least identical with respect to the position of the seam hiding means components incorporated in the display tile. The latter is illustrated by way of example in FIG. 3.

Figure 4:
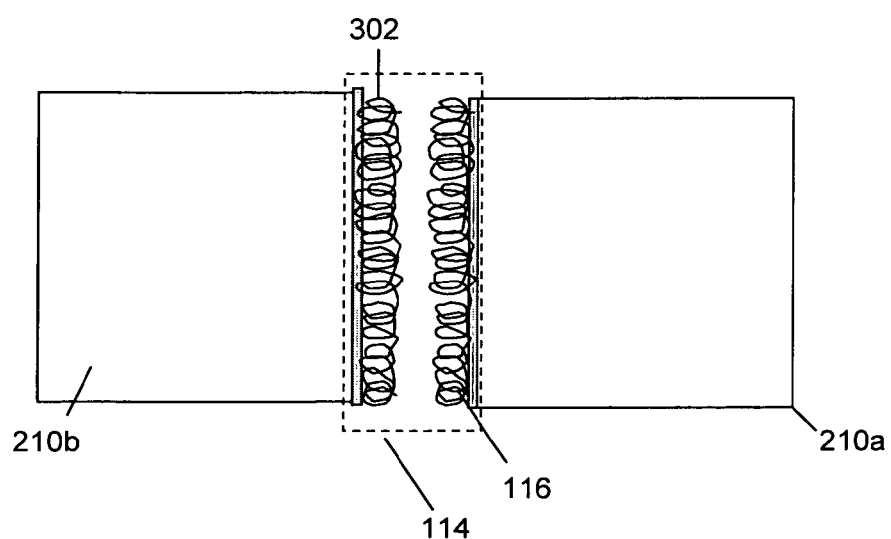
FIG. 4 illustrates part of an exemplary tiled display wherein a light blocking cloth is connected to one edge of a display tile and a second cloth capable of partly interacting with the light blocking cloth is connected to an edge of a neighbouring display tile, according to a particular embodiment of the present invention.

In a second particular example, the seam hiding means 114 comprises or consists of a first light absorbing cloth or textile 116 connected to one display tile, e.g. to the edge of one display tile 210a, and a second cloth or textile 302 connected to a neighbouring display tile, e.g. to an edge of the neighbouring display tile 210b. The first light absorbing cloth or textile 116 and the second cloth or textile 302, optionally and advantageously also a light absorbing cloth or textile, may be the same type of cloth or textile, but do not need to be so. Part of a tiled display is shown in FIG. 4, illustrating an exemplary view of part of two display tiles 210a, 210b respectively provided with a first light absorbing cloth or textile 116 and a second cloth or textile 302, in the present example being the same material. It is an advantage of such an embodiment that the full seam hiding means 114 can be applied prior to assembling the display tile wall whereby no further mechanical or other means are required for applying or fixing the seam hiding means 114 during assembly, thus resulting in an easier and efficient assembling process. In other words, the provision of the components of the seam hiding means 114 can be done prior to assembly such that the seam hiding means 114 is formed automatically by placing the display tiles next to each other, reducing or even avoiding the need for additional steps for hiding the seams after the display tiles have been positioned next to or adjacent each other. It is furthermore an advantage that the provision of the seam hider between the display tiles can be done a plurality of times using the same material, i.e. the seam hider is re-usable.

In a third particular example, the at least one light absorbing cloth or textile 116 as used in any of the above provided embodiments or examples and, if present, optionally also the second cloth or textile, may be a fabric with extensions or erect parts erecting from the fabric surface such as e.g. in pile, nap or flock printed fabric. These may include tufts, loops or other erect yarns on all or part of the fabric surface. Such fabrics may be warp-type, filling-type, knotted-pile type, loop type, cut-pile type, flocked type, nap type etc. Examples of such cloth or textile materials may be for example textile with hairs or loop like structures such as for example available from hook and loop fasteners, burr fasteners or touch fasteners, such as e.g. but not limited to Velcro® or Velcro-like systems. These cloth or textile materials advantageously provide an optically even more appropriately absorbing seam material thus further assisting in avoiding stray or environmental light to pass. In one particular further example, when two cloths or textiles are present, both the first and second cloth or textile may be made of fabric with extensions or erect parts erecting from the fabric surface and, when brought into contact, the extensions or erect parts of the first cloth or textile 116 may shift or slide in between the extensions or erect parts of the second cloth or textile thus again forming a good optical absorbing material in the seam, i.e. appropriately absorbing stray light or environmental light in the seam. They further can be separated without applying large forces. It is an advantage of these cloth or textile materials that formation of an appropriately absorbing seam hider can be reversibly obtained over a large number of times, without reduction of the seam hiding properties when the seam hiding means 114 is re-obtained upon assembly of the tiled display. In one other example, first cloth or textile material may be connected to two edges of a display tile, e.g. prior to assembly, and second cloth or textile material may be connected to two other edges of the display tile, e.g. prior to assembly. In one example both types of fabric of a hook and loop fastener may be used.

It is an advantage of some embodiments of the present invention that an interaction between the display tiles is obtained by the seam hiding means 114, thus assisting in alignment of the display tiles. As discussed above, a part of the visibility of the seams stems from a spacing between the display tiles 110 such that the pitch between pixels at the edge of neighbouring display tiles differs from the pitch between neighbouring pixels within one display tile. A number of features assists in controlling the width of the gap between the display tiles, upon and after assembly. Advantageously, the right tolerances on the mechanical design of the carrying structures of the display elements may be appropriately defined. The tolerances at build time and at life time may be kept under control by using glued structures instead of structures constructed by means of normal construction techniques (moulding, milling . . . ). The gluing process is a stress-less process which, at manufacturing time, does not generate any deformations while curing. The materials used may be composite materials which may be made of carbon fibres and appropriate resins. The display tile connecting components may be made of milled solid metal components, which match with the materials used within the separate display tiles and the materials used in the carrying structures.

According to particular embodiments of the present invention, the seam hiding means 114 furthermore is adapted for assisting in aligning the display tiles in the display wall. It is an advantage of embodiments of the present invention that the seam hiding means can be used for modular systems that allow a certain play in the mounting of the modules, whereby the seam hiding means is adapted for at least partly compensating for the play. The latter is obtained by having a seam hiding means 114 having an average compressive strength for providing a counter pressure to shifting of a display tile 110. The latter may assist in obtaining, upon and after assembly, a seam width close to or corresponding with the pitch between pixels of a single display tile. Thus, according to these embodiments, the individual display tiles 110 are stabilized into a certain position through pressure. The seam hiding means 114 thus may assist in preventing that the separate display tiles 110 tend to set to the outer limits given by the tolerances of the structures and the display tiles 110, once the display tiles 110 are mounted on the carrying structure. In this way, the overall uniformity of the tiled display, e.g. more particularly the pitch between pixels in the complete tiled display, may be high and "gravity" and "outer limits of tolerance" dependency of the mechanical seams is reduced or even avoided. The counter pressure is provided by the mechanical resistance, i.e. compressive strength, of the seam hiding means 114 comprising the at least one light absorbing cloth or textile, e.g. more particularly by the compressive strength of the cloth or textile or combination of cloths or textiles used because of the flexible nature of the seam hiding means 114. The seam hiding means 114 thereby pushes the separate display tiles towards their average position, e.g. against any gravity effect. Because of this, the display tiles and their mechanical connections will not be at the outer tolerances settings or positions but instead mechanical connections and display tiles will be pushed back to their average, e.g. average position, viewed over the complete display structure. It thus is an advantage of embodiments according to the present invention that the mechanical properties of the seam hiding means 114, or more particularly the mechanical properties of the cloth(s)/textile(s) used therein, can be selected so as to avoid slipping or shifting, e.g. due to gravity, of the display tiles, e.g. during assembling. The latter is advantageous as it allows to approximate or maintain predetermined seam widths, advantageously corresponding with the pitch between different pixels of the display tiles. In advantageous embodiments, components of the seam hiding means 114 may be connected to the outer edge or edges of display tiles, as described in more detail in the particular embodiments above. The at least one light absorbing cloth or textile 116 of the seam hiding means 114 may have for example an average compressive strength adapted to withstand a force for lifting the weight of one display tile or display module. No assembly force is to be dealt with. The required strength may be selected as function of the weight of the module and the size of the textile used. In one example, the mass of one module may be up to 1 kg, resulting in a force on the textile of about 10N. The compressive force to be countered may be between 0.1N and 1000N, e.g. between 0.5N and 100N, e.g. between 1N and 10N. The compressive strength of the seam hiding means assists in positioning individual modules, e.g. by assisting in positioning alignment pins of the individual modules in alignment holes having a significant tolerance with respect to the alignment pins, the seam hider thus shifting the alignment pin to an appropriate position in the hole. The compressive strength of the seam hiding means may be sufficient to counter a force between 1N and 100N, e.g. between 5N and 15N. The compressive strength of the at least one textile material may be in average between 0.01 kPa and 10 kPa at a deformation of 25, or a deformation of 33% or a deformation of 50%. The thickness of the seam hiding means 114, after assembly, preferably corresponds with the pixel pitch of the individual display tiles. In one particular example, the invention not being limited to it, the thickness of the material prior to compression may be between 2 mm and 3 mm, whereas after compression by the tile it may vary between 1 mm and 2 mm. Such material may for example be suitable to obtain an appropriate seam hide when the pixel pitch is between 3 mm and 12 mm. An explicit example that may be used is a 100% polyamide loop type set of cloths or textiles, as for example available from Alfatex, Belgium. It is an advantage of embodiments of the present invention that the seam hiding means may fulfill both the action of alignment of the tiles resulting in an appropriate seam size and the action of optical blocking, resulting in less or no unwanted light being visible. The latter reduces the number of components needed for making the seams invisible. Furthermore, the seam hiding means 114 may be reusable and the alignment function is substantially not influenced by radiation, heating, destruction due to inserting of the tiles or a combination thereof.

Figure 5:
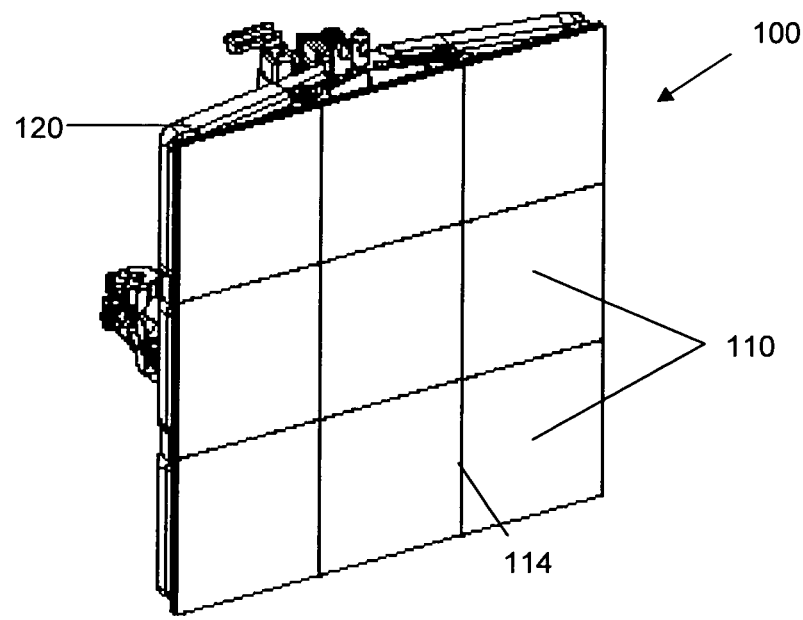
FIG. 5 illustrates an example of an embodiment according to the first aspect of the present invention indicating an isometric view of the front side of a tiled display with 9 individual display tiles.
Figure 6:
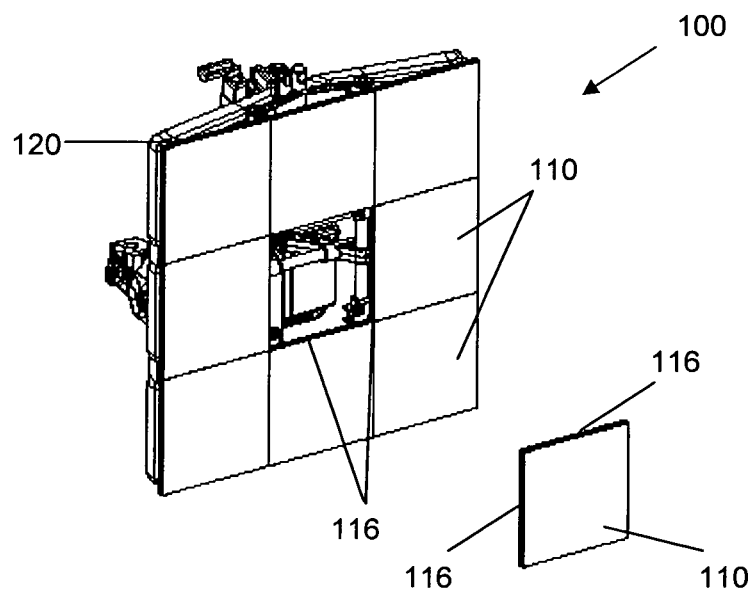
FIG. 6 and FIG. 7 illustrate an isometric view of the front side of the tiled display illustrated in FIG. 5, whereby the centre display tile has been removed to illustrate the seam hider at the outer edges of the individual tile.
Figure 7:
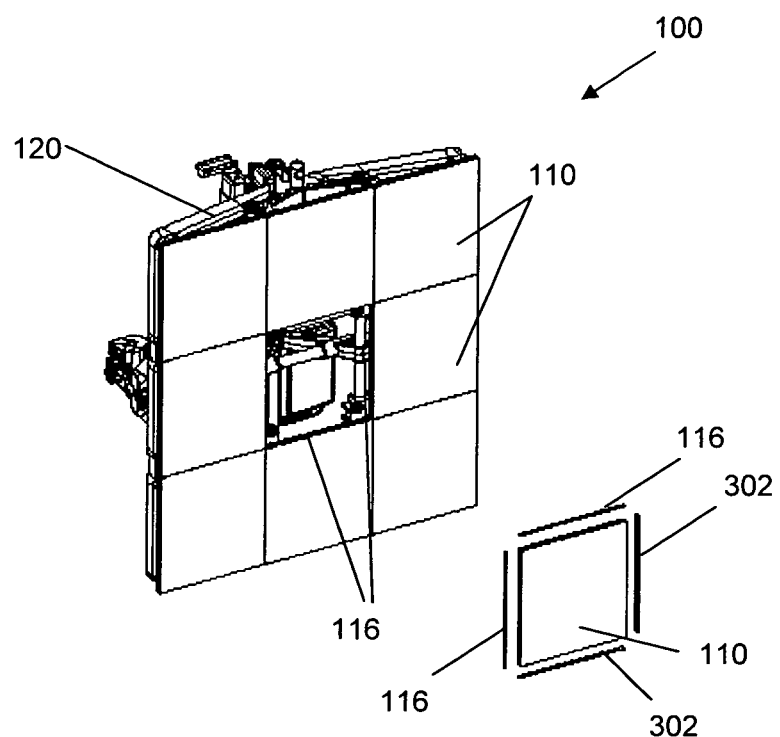

By way of example, FIG. 5 illustrates an exemplary tiled display 100 according to an embodiment of the present invention. In this example, nine individual display tiles 110 are provided arranged side by side and a seam hiding means 114 is provided. FIG. 5 and FIG. 6 illustrate the same tiled display 100 wherein the central display tile is removed, illustrating the seam hiding means at the edge of the display tiles in normal and exploded view. In the present example, the at least one light absorbing cloth or textile 116 having erecting parts erecting from the fabric surface is connected to all the display tile edges for engagement with similar light absorbing cloths or textiles of neighbouring display tiles upon assembly, thus forming the seam hiding means 114 is in the seam between neighbouring display tiles.

It is to be noticed that whereas the first cloth or textile has been indicated as light absorbing cloth or textile, the features of the above aspects and embodiments also can be applied with a non light absorbing cloth or textile, whereby no advantage of absorbing stray light or environmental light in the seams is obtained, but wherein the cloth or textile still may fulfill the alignment and/or positioning function as described above, thus resulting in an improved alignment and thus in a reduced visibility of the seams.

In a second aspect, the present invention relates to a display tile 110 for use in a tiled display 100, the display tile 110 comprising a plurality of pixels or light sources 150 and a light absorbing cloth or textile 116 connected to a first edge or first edges of the display tile 110 for assisting in hiding of a seam 114 between the display tile 110 and neighboring display tiles when the display tile 110 is assembled in a tiled display 100. The display tile 110 furthermore may comprise connecting means 230 at second sides of the tile for connecting to light absorbing cloths or textiles of neighboring tiles. The display tile may comprise a second cloth or textile 302 that is adapted for cooperating with the light absorbing cloth or textile 116 to form a good optical absorber of stray or environmental light for hiding the seam. The display tile 110 may further comprise the same features and advantages as display tiles described in the first aspect of the present invention. It may be especially suitable for use in a tiled display according to the first aspect of the present invention.

In a third aspect, the present invention relates to a method for assembling a tiled display 100 such that seams between display tiles 110 of the tiled display 100 are little or not visible. The method comprises obtaining a plurality of display tiles 110. Obtaining a plurality of display tiles 110 may comprise obtaining pre-made display tiles 110 or manufacturing the display tiles 110. The latter may advantageously include, besides conventional steps for manufacturing the display tiles, providing light absorbing cloths or textiles 116 to first edges of the display tiles 110 and optionally connection means 230 to second edges of the display tiles 110, although the invention is not limited thereto. In one embodiment, conventional display tiles 110 may be obtained first and the method may comprise connecting light absorbing cloths or textiles 116 to first edges of the display tiles 110, prior to arranging the display tiles side by side. The method also may comprise providing connection means 230 to second edges of the display tiles, prior to arranging the display tiles side by side. The method may in a particular embodiment comprise providing a connection means 230 to an edge of a display tile 110 that will be positioned neighbouring to a first display tile 110 to which the light absorbing cloth or textile 116 is connected. The connection means 230 may be any suitable means as described above for the first aspect, such as e.g. glue, hooks, material for providing screws, staples or nails or e.g. a second cloth or textile 302 adapted for interacting with the light absorbing cloth or textile 116, e.g. such as hook and loop structures. Obtaining display tiles 110 alternatively may comprise obtaining conventional display tiles 110 whereby no components of the seam hiding means 114 are connected to the display tiles 110. The method further comprises arranging the plurality of display tiles 110 side by side, whereby a seam hiding means 114 is provided in at least one seam 112 between two neighbouring display tiles 110. The seam hiding means 114 thereby comprises at least one light absorbing cloth or textile 116. Depending on the display tiles 110 obtained, the latter may comprise automatically providing the seam hiding means 114 by contacting a display tile 110 with a neighbouring display tile 110, connecting the light absorbing cloth or textile 116 connected to a first display tile 110 to the neighbouring display tile 110 in any suitable way such that the seam hiding means 114 is present in the seam 112, introducing light absorbing cloths or textiles 116 in the seam 112 between two neighbouring display tiles 110 without connecting it to the neighbouring display tiles, introducing light absorbing cloths or textiles 116 in the seam 112 between two neighbouring display tiles 110 and connecting to at least one and optionally two of the neighbouring display tiles 110, etc. The method also may comprise connecting a second cloth or textile material to the edge of a neighbouring display tile and providing interaction between the first light absorbing textile or cloth and a second textile or cloth of a neighbouring tile by shifting erect parts erecting from a surface of the first textile or cloth in between erect parts erecting from a surface of the second textile or cloth. It is an advantage of such a method of assembly that the seam hiding means 114 may provide the functionality of blocking stray or environmental light in the seams. In particular embodiments of the present invention, wherein an interaction or connection is obtained between the seam hiding means and the display tiles, it is an advantage that further assistance in the alignment or positioning of the display tiles is provided by the seam hiding means. In the advantageous embodiment wherein the seam hiding means components are connected to the display tiles prior to assembly, it is an advantage that little or no additional steps are needed after positioning of the display tiles, resulting in an easy assembling of the tiled display. The present invention furthermore relates to a method for providing maintenance of a tiled display 100. The latter may be required if one of the display tiles 110 performs below a predetermined quality standard or for cleaning, checking or adjusting a display tile. The method comprises removing a display tile 110 from the tiled display 100 by disengaging or removing a first light absorbing cloth or textile 116 connected to the display tile 110 from the edge or a second cloth or textile of a neighbouring tile 110 and introducing a cleaned, checked and/or adjusted display tile 110 or a replacement display tile 110 for the removed display tile. The latter may be performed by contacting a first light absorbing cloth or textile connected to an edge of the cleaned, checked and/or adjusted display tile 110 with an edge of or a second cloth or textile connected to the neighbouring tile 110. Contacting with a second cloth or textile 302 may comprise shifting erect parts erecting from a fabric surface of the cloth or textile 302 in between erect parts of the first light absorbing cloth or textile. The system thus is adapted for reversibly forming the seam hiding means, using and/or re-using the same components.

Different other steps such as connecting the display tiles 110 to a base plate 120, e.g. by gluing, electrically connecting the display tiles, calibrating the display tiles with respect to their optical emission characteristics, etc. optionally also may be part of the method for assembling and providing maintenance. Furthermore, electrical disconnection of the display tile or tiles prior to their removal and/or checking, cleaning or adjusting a display when removed from the tiled display, may also be part of the method for providing maintenance.

It is an advantage of some embodiments according to the present invention that the provision of seam hiding means may be performed automatically upon positioning of the display tiles, without requirements of additional mechanical interference, e.g. by human. It also is an advantage of some embodiments of the present invention that the provision of seam hiding means is reversible without destruction of the seam hiding means, thus making it possible to re-use them.

It is an advantage of embodiments according to the present invention that a method is provided for assembling a tiled display resulting in a high overall uniformity of a tiled display system.

It is an advantage of embodiments according to the present invention that the seam hiding means may be provided to individual display tiles and may individually align the display tiles or keep them in their appropriate position.

It is to be understood that although preferred embodiments, specific constructions and configurations, as well as materials, have been discussed herein for devices according to the present invention, various changes or modifications in form and detail may be made without departing from the scope of this invention as defined by the appended claims. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is

1. A tiled display for lighting or imaging, the tiled display comprising:
  a plurality of display tiles arranged side by side, each of said plurality of display tiles having a front surface, back surface, and side surfaces, and
  at least one seam hiding arrangement comprising at least one light absorbing textile or cloth located in a seam between two neighbouring display tiles to prevent unwanted light from being visible,
  wherein the at least one light absorbing textile or cloth is arranged on a side surface of at least one display tile in a way such that, when at least two neighbouring display tiles are connected, the at least one light absorbing textile or cloth is configured to align the at least two neighbouring display tiles to an appropriate pixel pitch by having an average compressive strength for providing a counter pressure to a shifting display tile.

2. The tiled display according to claim 1, wherein the at least one light absorbing textile or cloth is connected to at least one display tile.

3. The tiled display according to claim 2, wherein the at least one light absorbing textile or cloth is connectable to a neighbouring display tile of the at least one display tile.

4. The tiled display according to claim 1, the seam hiding arrangement comprising a second textile or cloth connected to an edge of said neighbouring display tile, wherein the at least one absorbing textile or cloth is configured to interact with said second textile or cloth by shifting erect parts erecting from a surface of the first textile or cloth in between erect parts erecting from a surface of the second textile or cloth.

5. The tiled display according to claim 4, wherein the second textile or cloth is a light absorbing textile or cloth.

6. The tiled display according to claim 1, wherein the seam hiding arrangement has an average compressive strength configured to counter a gravity force of a single display tile.

7. The tiled display according to claim 1, wherein the textile or cloth material of the at least one light absorbing textile or cloth comprises at least 75% of polyamides.

8. The tiled display system comprising a tiled display according to claim 1 and a driving device arranged to drive a plurality of display tiles in said tiled display.

9. The tiled display according to claim 1, wherein the at least one light absorbing textile or cloth has an average compressive strength between 0.01 kPa and 10 kPa.

10. The tiled display according to claim 9, wherein the at least one light absorbing textile or cloth is configured to counter a shifting force of a display tile of between 1 N to 100 N.

11. The tiled display according to claim 1, wherein the at least one light absorbing textile or cloth has an average compressive strength between 0.01 kPa and 10 kPa at a deformation between 25-50%.

12. A display tile for use in a tiled display, the display tile comprising a light absorbing textile or cloth connected to the display tile and arranged to assist in hiding of a seam between the display tile and neighbouring display tiles when the display tile is assembled in a tiled display,
  wherein the display tile has a front surface, back surface, and side surfaces, and
  wherein the light absorbing textile or cloth is arranged on a side surface of the display tile in a way such that when the display tile is used in a tiled display where at least two neighboring display tiles are connected, the light absorbing textile or cloth is configured to align the at least two neighboring display tiles to an appropriate pixel pitch by having an average compressive strength for providing a counter pressure to a shifting display tile.

13. The display tile according to claim 12, wherein the display tile comprises a connecting arrangement enabling connecting of the display tile to light absorbing textiles or cloths of neighbouring tiles when the display tile is assembled in a tiled display.

14. The display tile according to claim 12, wherein the display tile comprises a second textile or cloth that is configured to interact with the first light absorbing textile or cloth of a neighbouring tile by shifting erect parts erecting from a surface of the first textile or cloth in between erect parts erecting from a surface of the second textile or cloth.

* * * * *